No. 806,520. PATENTED DEC. 5, 1905.
H. L. CANNE.
METALLIC OVERSHOE FOR VEHICLE WHEELS.
APPLICATION FILED FEB. 21, 1905.
2 SHEETS—SHEET 1.
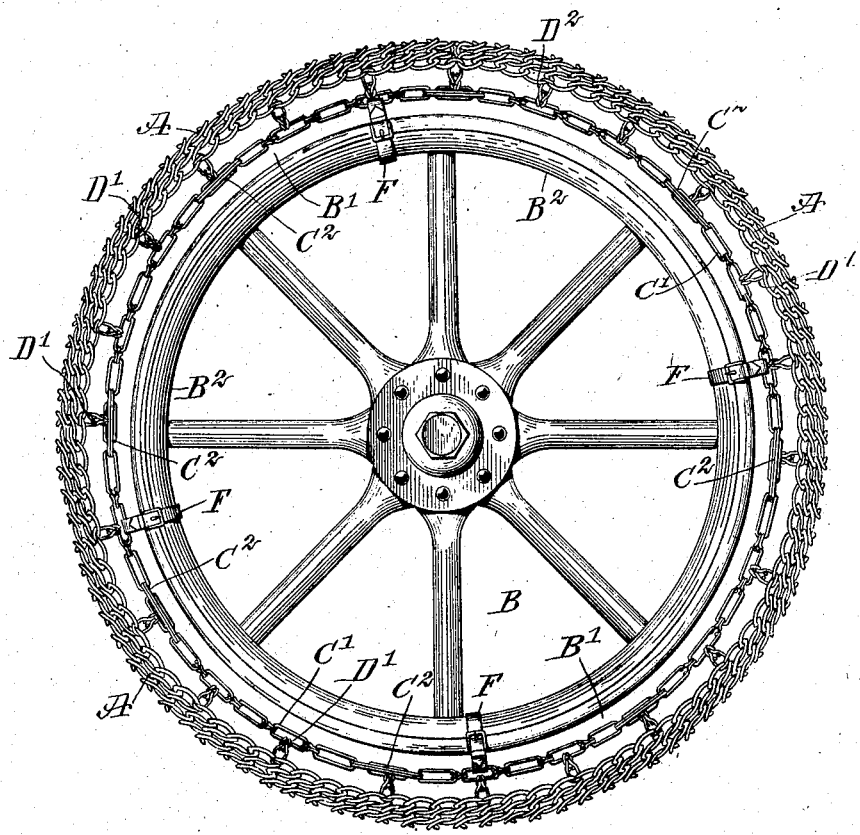
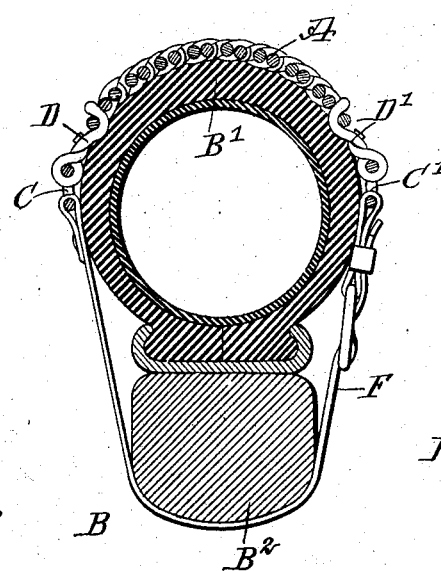
WITNESSES:
INVENTOR
Henry L. Canne
BY
ATTORNEYS

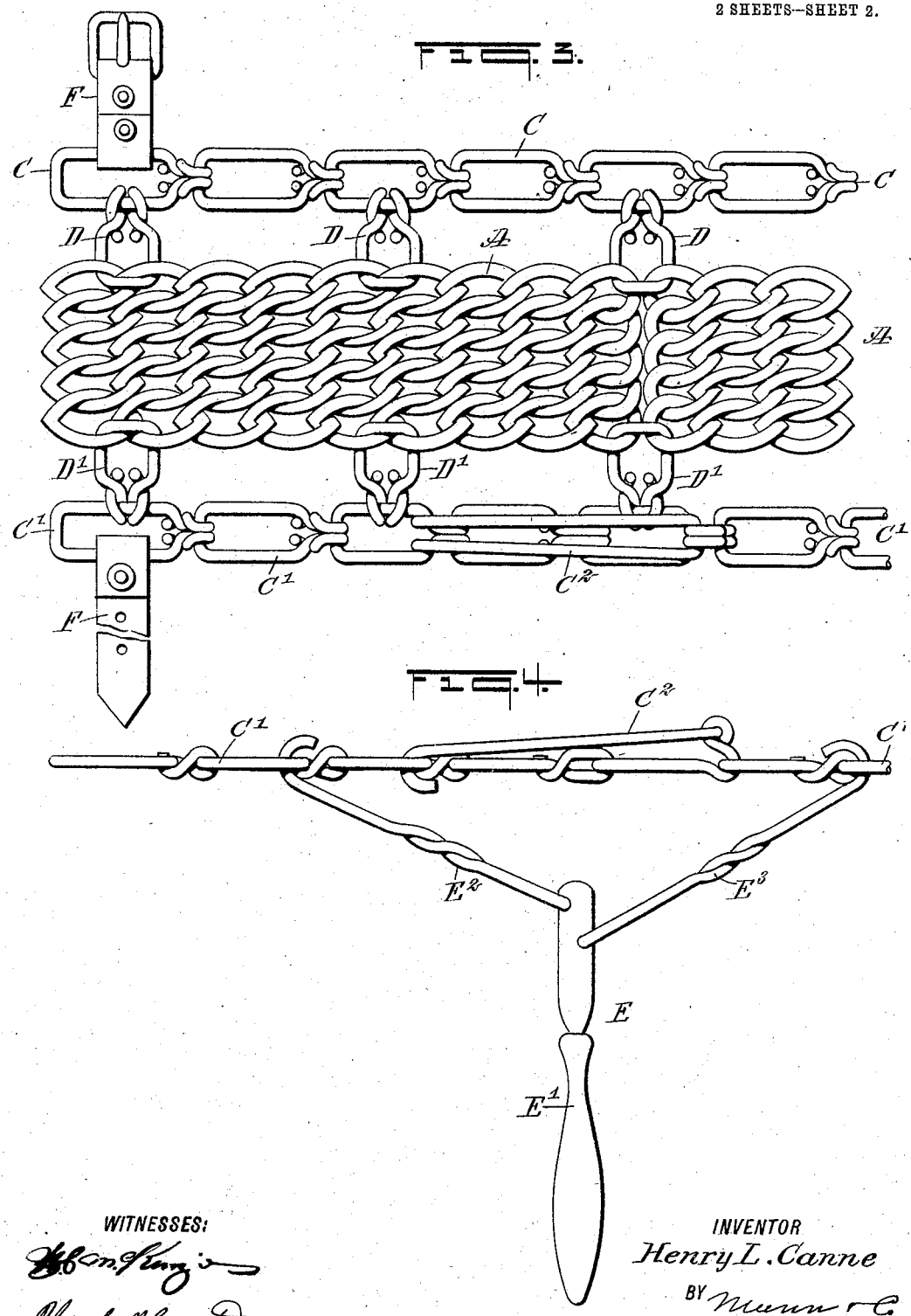

UNITED STATES PATENT OFFICE.

HENRY L. CANNE, OF DINGMAN TOWNSHIP, PIKE COUNTY, PENNSYLVANIA.

METALLIC OVERSHOE FOR VEHICLE-WHEELS.

No. 806,520.　　　　Specification of Letters Patent.　　　　Patented Dec. 5, 1905.

Application filed February 21, 1905. Serial No. 246,724.

*To all whom it may concern:*

Be it known that I, HENRY L. CANNE, a citizen of the United States, and a resident of Dingman township, in the county of Pike and State of Pennsylvania, have invented a new and Improved Metallic Overshoe for Vehicle-Wheels, of which the following is a full, clear, and exact description.

The invention relates to automobiles, bicycles, and other vehicles having wheels with solid or pneumatic tires; and its object is to provide a new and improved metallic overshoe for vehicle-wheels, to increase their traction-power without impairing the flexibility of the tires, to prevent undue wear of the tire and puncturing thereof, if pneumatic, and to prevent the wheels from skidding or slipping on wet or slippery roadways.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a side elevation of the improvement as applied to a vehicle-wheel having a pneumatic tire. Fig. 2 is an enlarged transverse section of the same. Fig. 3 is an enlarged face view of the improvement, and Fig. 4 is an edge view of the same and the tool employed for drawing the ends of the sectional side chain together.

The metallic overshoe for vehicle-wheels consists, essentially, of an endless belt $A$, made of links interlocked transversely and longitudinally to flex both transversely and longitudinally, and thereby readily fit the tread $B'$ of the vehicle-wheel $B$ on which the overshoe is to be used. Side chains $C$ and $C'$ are connected at intervals by links $D$ and $D'$, respectively, with the opposite sides of the endless link belt $A$, the side chain $C$ being endless, while the side chain $C'$ is made in sections adapted to be fastened together by hook-links $C^2$, as plainly shown in Figs. 1, 3, and 4, the ends of adjacent sections being drawn together for conveniently closing the hook-links $C^2$ by the use of a suitable tool $E$—such, for instance, as indicated in Fig. 4 and consisting of a handle $E'$ and two bars $E^2$ and $E^3$ for engaging the links of adjacent chain-sections.

The side chains $C$ and $C'$ are adapted to be connected with each other by suitable buckle-straps $F$ passing around the rim $B^2$ of the vehicle-wheel, so as to securely hold the overshoe in position on the wheel. As illustrated in Fig. 1, about four such straps $F$ are needed; but more or less may be employed, if desired.

In making the belt $A$ the same is formed in the shape of a band, the ends of which are united by the pair of links $D$ and $D'$, (see the right-hand side of Fig. 3;) but other suitable means may be employed for connecting the ends of the band with each other to form the endless link belt $A$.

The overshoe can be applied at any time to the vehicle-wheel, and for this purpose the device when in an open position—that is, with the buckle-straps $F$ open as well as the hook-links $C^2$ unhooked—is placed with the belt $A$ onto the tire $B'$, and then the top strap $F$ is first loosely buckled, then the following side straps $F$ are firmly buckled, after which the wheel is turned to bring the last strap on top to allow of conveniently closing this strap to securely hold the device in place on the wheel. The operator now by the use of the tool $E$ closes the several hook-links $C^2$, so as to render the chain $C'$ continuous.

By the arrangement described the belt $A$ covers the tread $B'$ of the vehicle-wheel, while the side chains $C$ and $C'$ and straps $F$ hold the belt against transverse and longitudinal movement on the wheel.

By having the belt $A$ made of links interlocked both transversely and longitudinally it is evident that an exceedingly flexible belt is provided, which gives increased traction of the wheel without impairing the flexibility of the tire, and at the same time the said belt prevents puncturing of the tire and holds the wheel against skidding or slipping on wet or slippery roadways.

The link belt $A$ is made of different widths to suit different sizes of tires.

The device can be placed in position on a wheel or removed therefrom at any time by simply disconnecting the hook-links $C^2$ and opening the straps $F$ and taking the device off the wheel.

The metallic overshoe for vehicle-wheels can be very cheaply manufactured and can be readily carried along in the vehicle for instant use whenever required.

It is understood that the device can be readily used for both solid or pneumatic tires to prevent undue wearing, skidding, or slipping.

Having thus described my invention, I claim as new and desire to secure by Letters Patent—

1. In a metallic overshoe for vehicle-wheels, comprising an endless metallic belt formed of links interlocked transversely and longitudinally, an endless chain on one side of the belt, a sectional chain on the other side of the belt, oppositely-disposed links connecting the side chains with the belt at intervals, hooks for connecting the sections of the side chain, and transverse straps for engaging the rim of the wheel and connecting the side chains with each other.

2. A metallic overshoe for vehicle-wheels, comprising an endless metallic belt, formed of oblong links of relatively small openings, interlocked transversely and longitudinally, an endless chain on one side of the belt, a sectional chain on the other side of the belt, oppositely-disposed links connecting the side chains with the belt at intervals, hooks for connecting the sections of the side chains and transverse straps for engaging the rim of the wheel and connecting the side chains with each other.

3. A metallic overshoe for vehicle-wheels, comprising an endless metallic belt, formed from substantially diamond-shaped links of relatively small openings interlocked transversely and longitudinally, an endless chain on one side of the belt, a sectional chain on the other side of the belt, oppositely-disposed links connecting the side chain with the belt at intervals, hooks for connecting the sections of the side chains and transverse straps for engaging the rim of the wheel and connecting the side chains with each other.

In testimony whereof I have signed my name to this specification in the presence of two subscribing witnesses.

HENRY L. CANNE.

Witnesses:
 GEO. R. BULL,
 C. W. BULL.